Feb. 18, 1969  M. A. PICHEL  3,428,533
HIGH QUALITY SUB-MASTERS AND METHOD FOR PRODUCING THEM
Filed April 13, 1964
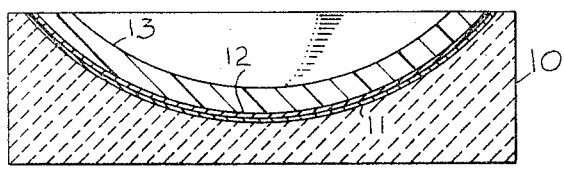
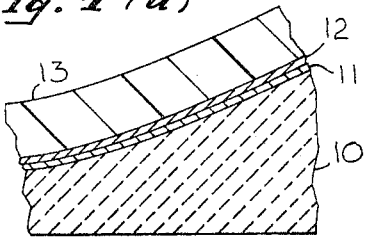
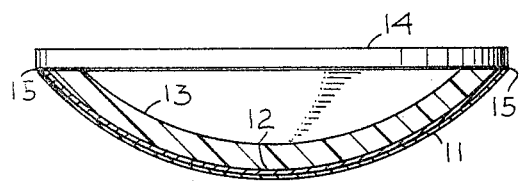
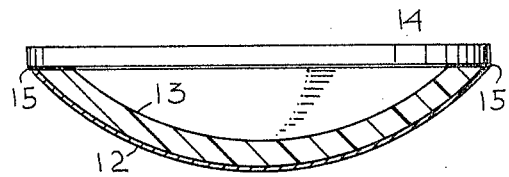
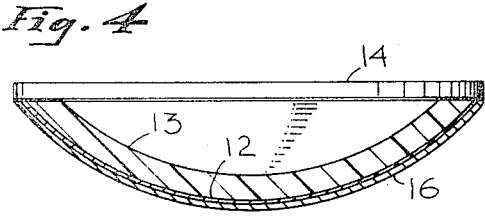
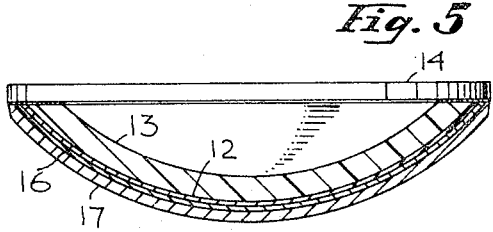
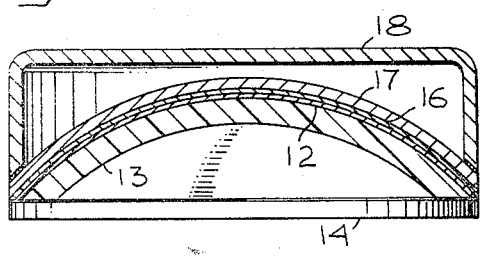
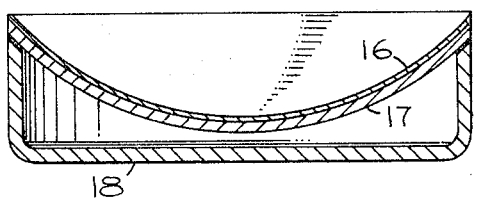
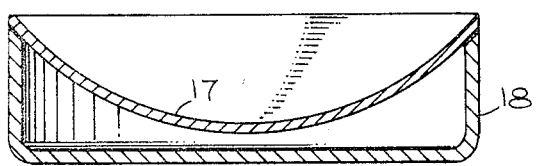
INVENTOR
MARLOWE A. PICHEL
BY Allen E. Botney
ATTORNEY

United States Patent Office 3,428,533
Patented Feb. 18, 1969

3,428,533
HIGH QUALITY SUB-MASTERS AND METHOD FOR PRODUCING THEM
Marlowe A. Pichel, La Canada, Calif., assignor to Electro-Optical Systems, Inc., Pasadena, Calif.
Filed Apr. 13, 1964, Ser. No. 359,280
U.S. Cl. 204—7      6 Claims
Int. Cl. C23b 7/08

The present invention relates in general to the electroforming art and more particularly relates to the production of a high quaility replica master or sub-master that may be used in the electroforming art as a substitute for the master itself.

The electroforming art is merely another side of the electroplating art and involves the formation of either a thick or thin layer of metal whose shape conforms exactly to the shape of a master. Upon separation of the metal layer from the master, a backing structure is mounted on this replica to support it against buckling, bending, etc. and to otherwise accurately maintain its geometry. By way of example, the electroforming art is used in the fabrication of a very light and very accurate reflecting mirror, such as a parabolic mirror.

However, in manufacturing these mirrors or other such elements, a problem has been encountered which has heretofore caused a good deal of expense and trouble. More specifically, the master, which is customarily made of glass, is very expensive and from time to time it breaks or otherwise becomes damaged. Accordingly, a technique for producing a high quality replica master or sub-master which could then be used in lieu of the master would be a highly desirable technique. The present invention is directed or concerned with such a technique. Stating it more succinctly, the present invention is concerned with providing a dispensable substitute for the glass master customarily used by those in the electroforming art.

Hence, in accordance with the present invention, the first step involves employing the glass master to cast a plastic submaster from it. In the case of a parabolic reflecting mirror, for example, the plastic may be poured into the hollow of the master and cured in an oven while the master is rotated at a uniform speed in that oven. By so doing, the plastic spreads outward because of the centrifugal forces involved and thereby assumes the shape of the glass master. The plastic material cures in this shape. Following this, the plastic sub-master is first separated from the glass master and then replicated with nickel, by which is meant that a layer of nickel is deposited over the plastic sub-master. Next, a structure is mounted onto the metal replica to rigidize it. The rigidized replica is then parted from the sub-master, after which a hard surface, such as a rhodium or chromium surface, is plated over the nickel face of the replica to provide it with a scratch and abrasion resistant surface. At this point, the rigidized metal replica may be utilized instead of the glass master and as many plastic sub-masters made from it as may be needed.

The provision of a rigidized replica as a substitute for a glass master avoids a number of problems existing in the electroforming art as it is now practiced. Thus, it eliminates unnecessary exposure of the glass master to breakage during the spin-cast operation. Furthermore, in the case of large scale production, it reduces the number of glass masters required to be purchased since the same glass master can be used to fabricate a number of replica masters. Moreover, since the metal replica-master can withstand higher temperatures than the glass master, it allows plastic sub-masters to be cured at higher temperatures and, therefore, on a more rapid and thus less costly schedule. Finally, when compared to glass, the metal replica-master has an extremely long process life.

It is, therefore, an object of the present invention to provide an effective substitute for the glass masters customarily used by those in the electroforming art.

It is another object of the present invention to provide a method for the fabrication of rigidized metal structures which can be used in lieu of glass masters to electroform products with substantially the same optical accuracy.

It is a further object of the present invention to provide an inexpensive substitute for glass masters without any sacrifice in the quality in the electroformed objects obtained from them.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only and it is not intended as a definition of the limits of the invention.

FIGURE 1 is a front view, in cross-section, of a glass master and the steps involved in the formation of a plastic sub-master from it;

FIGURE 1(a) is an enlarged view of a small section of the FIG. 1 arrangement;

FIGURE 2 is a front view, in cross-section, of the plastic sub-master maintained in its shape by a rigidizing structure;

FIGURE 3 is the FIG. 2 sub-master but with its outermost layer, namely, the release layer, removed;

FIGURE 4 is a repeat of the FIG. 3 sub-master but with the additional outer conductive or sensitizing layer coated on it;

FIGURE 5 illustrates the sub-master of FIG. 4 once again but with a layer of metal, such as nickel, coated over the conductive or sensitizing layer;

FIGURE 6 illustrates the addition of a rigidizing structure to the outer metal layer in the FIG. 5 apparatus to form the replica metal master;

FIGURE 7 is the replica metal master separated from the plastic sub-master apparatus in FIG. 6; and FIGURE 8 is the replica metal master once again but with the conductive or sensitizing layer removed, that is to say, FIG. 8 illustrates the final replica metal master construction.

In considering the invention in detail, it should be emphasized and recognized at the outset that although a metal master for a parabolic mirror will be described below as well as the replication process by which it is made, the process is not limited to the fabrication of mirrors alone but, rather, is applicable to the fabrication of metal masters for other kinds of optical elements as well.

With this in mind, reference is now made to FIG. 1 wherein is shown a parabolically-shaped glass master 10 that may be used in the fabrication of electroformed parabolic mirrors. In practicing the invention, the glass master is first mounted on a suitable support (not shown) that holds the master in an undistorted position during the first steps of the process. Because such mounts or supports are so well known and are conventional in the electroforming art and, furthermore, because they are not a part of the present invention, a mount or support is not shown herein.

Having mounted the glass master for the reason mentioned, the optical surface area of the master is then thoroughly cleansed by any good glass cleaning technique as is known and empolyed by the optical coating industry. Following this, a non-adherent and pin-hole free metal release layer 11 is vacuum deposited on the optical surface of the glass master. A number of different kinds of metal may be used as the release layer, such as copper, which is the preferred metal, silver, gold, etc., the only criterion being that it should be thick enough to be opaque but not too thick or else its surface will become granular, a condition that is preferably avoided. Vacuum chambers and vacuum deposition are well known in the arts and sciences and, therefore, it is not deemed necessary here to describe a vacuum chamber in detail or the manner in which it is used. If a hard protective surface coating or other special surface coating is required over release layer 11, it may also be vacuum deposited at this time. Thus, in FIG. 1, a hard protective layer 12, namely, a layer of silicon monoxide, is shown coated over release layer 11.

At this point, the coated master is removed from the vacuum chamber and firmly mounted either on a spin fixture or on a casting fixture of some kind, the particular fixture employed being dependant upon the requirement for a parabolic or other shape. Since a parabolic figure is involved in the present instance or description, the coated glass master would be mounted upon a spin fixture of the kind disclosed by Burt J. Bittner in the patent that issued Nov. 28, 1961, Patent No. 3,010,153, for his invention entitled "Construction of Paraboloid Surfaces." With the master mounted on the spin fixture, a plastic, such as an epoxy resin mixture, is then poured in over silicon monoxide layer 12, the fixture then being activated to rotate at a uniform speed. By so doing, the plastic material spreads outward because of the centrifugal forces involved, with the result that it assumes the parabolic shape of the glass master. The plastic is cured as it rotates to ultimately produce a plastic sub-master having substantially the same shape and optical accuracy as the glass master itself. The plastic sub-master spoken of above is designated 13. In order that the FIG. 1 structure may be clearly visualized and understood, an enlarged section of it is presented in FIG. 1(a) wherein the several coatings or layers on the glass master and their relative thicknesses are clearly shown.

Having reached the stage shown in FIGS. 1 and 1(a), the next step in the process is that of parting or separating the plastic sub-master from the glass master. However, prior to this step, the plastic sub-master is rigidized with a suitable stable structure, such as a plate or weldment, etc., which is fixed to the plastic layer at its edge. Referring now to FIG. 2, the abovesaid stable structure is designated 14 therein and is fixed to plastic layer 13 by means of an epoxy or other adhesive 15 interposed between the plastic layer and the rigidizing structure, as is shown in the figure. With member 14 properly mounted, glass master 10 is removed to leave the remaining structure shown in FIG. 2. Release layer 11 having now served its purpose, it is removed with nitric acid or other chemical materials to leave the plastic sub-master which, in FIG. 3, is shown to comprise plastic layer 13 and its hard optical surface 12 made of silicon monoxide or some equivalent material.

With the completion of the plastic sub-master, the next major part of the process is initiated, namely, that of preparing the replica metal master from the plastic sub-master. To do so, the plastic sub-master is immersed in an electroplating bath but, before it is immersed, it must be properly prepared for it. Accordingly, the optical surface of the sub-master is first cleaned in the same well-known manner as was the glass master during the first steps of the process and then it is sensitized or rendered electrically conducting by coating it with a thin film or layer of metal, such as silver, which is customarily used for this purpose. In the event silver is used, it may be sprayed on the optical surface as is done in commercial mirror fabrication. A thin film or layer of silver is shown deposited on the optical surface of the plastic sub-master in FIG. 4 and is designated 16 therein. At this point, the sub-master is ready for the electroplating bath and, therefore, it is mounted as the cathode and thereafter immersed in the electroplating solution.

Although any one of a number of different kinds of plating solutions may be utilized, as is well known by those skilled in the electroplating art, a nickel plating solution is preferred in the present instance. Accordingly, employing necessary controls to assure a uniform stress-free deposition, a layer of nickel 17 is electroplated over silver layer 16. What is meant by "necessary controls" is already known in the art. Suffice it to say, therefore, that it involves proper circulation and temperature maintenance of the electroplating solution, uniform rotation of the sub-master cathode, maintaining a uniform composition or strength of the electroplating solution, etc., all of which contributes to the deposition of a nickel layer of uniform thickness and that is relatively stress free. When the nickel layer is of the desired thickness, the sub-master is removed from the bath, and then washed and dryed. The sub-master structure is now ready for the final steps in the process.

At this point, a backing or rigidizing structure 18 is mounted over the nickel layer, the rigidizing structure being of such shape and dimension such that it makes contact with the nickel layer along the edge of the latter. The rigidizing structure is mounted on or permanently affixed to the nickel layer by applying an epoxy adhesive along this edge between the two. A number of different kinds of backing or rigidizing structures are available but the one that is preferred is one that is generally spaced from the nickel layer, as is clearly shown in FIG. 6, and makes contact with the nickel only at its edge. The end portion of a cylindrical drum may be used for this purpose or something similar thereto. With rigidizing structure 18 firmly on nickel layer 17, the replica metal master is separated from the plastic sub-master, the replica metal master structure that separates from the plastic sub-master structure being shown in FIG. 7 to include silver layer 16 over nickel layer 17 supported by rigidizing structure 18. The separation may be effected by means of pneumatic, hydraulic, mechanical or other means, the only criterion being that the means used does not physically distort the replica. Techniques for providing such separations are well known in the art and practiced with great finesse.

The next step is that of chemically stripping the silver layer from the nickel layer and to do so in such a manner that the optical surface of the replica master, which is the common surface between the silver and nickel layers, is not degraded. To achieve this end, a solution composed of ammonium hydroxide (NH$_4$OH), hydrogen peroxide (H$_2$O$_2$) and distilled water can be used to strip the silver from the nickel without etching the nickel. Assuming that this has now been done, a hard scratch and abrasion resistant surface is provided over the nickel face to protect it and such materials as rhodium or chromium may be plated on as the protective layer. The final replica metal master comprising nickel layer 17 and rigidizing structure 18 is shown in FIG. 8 and it is on the concave optical surface of the nickel layer that the rhodium or chromium may be deposited for protection. The geometric accuracy and the optical characteristics of the replica metal master are now confirmed by conventional tests that are identical to those used for the original glass master and, when this is done, the replica metal master can be used as a substitute for the glass master, thereby preserving the latter.

Although a particular structure and process have been illustrated and described above by way of example, it is not intended that the invention be limited thereto. For example, the sub-master may be made in other ways than as herein described, such as by electroforming it, and used in the same manner to produce the replica master. Accordingly, the invention should be considered to include any and all modifications, alterations or equiva-

Having thus described the invention, what is claimed is:

1. A method of an optically accurate metal replica mirror master of an original glass mirror master, said method comprising the steps of: forming a plastic sub-master from the original glass master; sensitizing the working surface of the sub-master by coating it with an electrically conductive material; electroplating a metal layer over said electrically conductive coating; mounting a stable structure onto said metal layer to rigidize its shape; separating said rigidized structure from the plastic sub-master; and removing the coating of electrically conductive material from the metal layer by dissolving it in a solvent which is selective thereto without distorting the metal layer surface, thereby leaving the desired replica master.

2. The method defined in claim 1 wherein said method further includes the step of coating the working surface of the replica master with a layer of scratch and abrasion resistant material.

3. The method of claim 1 wherein the stable structure is mounted on said metal layer by adhesively bonding it thereto at their points of mutual contact.

4. A method of forming an optically accurate metal replica mirror master of an original glass mirror master, said method comprising the steps of: forming a plastic sub-master from the original glass master; coating a layer of silver over the working surface of the sub-master to render it electrically conductive; electroplating a nickel layer of the desired thickness over said silver layer; affixing a stable structure along the edge of said nickel layer, the affixing of the stable structure including the step of depositing an adhesive along the nickel edge between it and the stable structure; separating the plastic sub-master from the rigidized nickel and silver layers; removing the silver from the nickel layer by dissolving it in a solution of ammonium hydroxide and hydrogen peroxide in distilled water, thereby leaving the desired replica master.

5. A method of forming an optically accurate metal replica mirror master of an original glass mirror master, said method comprising the steps of: vacuum depositing a layer of release material over the working surface of the glass master; vacuum depositing a layer of silicon monoxide over the layer of release material; casting a layer of plastic material over said layer of silicon monoxide; mounting a stable structure onto said plastic layer to rigidize its shape; separating the glass master from the structure comprising the rigidized plastic, silicon monoxide and release layers; removing the layer of release material, thereby leaving the plastic sub-master; spraying a layer of silver over the working surface of the sub-master to render it electrically conductive; electroplating a nickel layer of the desired thickness over said silver layer; affixing a stable structure along the edge of said nickel layer to rigidize it, the affixing of the stable structure including the step of depositing an adhesive along the nickel edge between it and the stable structure; separating the plastic sub-master from the rigidized nickel and silver layers; removing the silver from the nickel layer by dissolving it in a solution of ammonuim hydroxide and hydrogen peroxide in distilled water, thereby leaving the desired replica master.

6. The method defined in claim 5 wherein said method further includes the step of coating the working surface of the nickel layer in the replica master with a layer of scratch and abrasion resistant material.

References Cited
UNITED STATES PATENTS

| | | | |
|---|---|---|---|
| 1,612,605 | 12/1926 | Buenaventura | 204—4 |
| 1,871,770 | 8/1932 | Bart | 204—7 |
| 2,834,052 | 5/1958 | Hunn | 204—6 |
| 2,865,821 | 12/1958 | Jonke et al. | 204—6 |
| 3,227,634 | 1/1966 | Rinzema et al. | 204—5 |
| 3,285,835 | 11/1966 | Farrow | 204—6 |
| 2,305,050 | 12/1942 | Wise et al. | 204—7 |

ROBERT K. MIHALEK, *Primary Examiner.*

W. VAN SISE, *Assistant Examiner.*

U.S. Cl. X.R.

117—106